(12) United States Patent
McLeod

(10) Patent No.: US 8,416,307 B2
(45) Date of Patent: Apr. 9, 2013

(54) CAMERA IMAGE STABILIZATION

(75) Inventor: Stuart McLeod, Linlithgow (GB)

(73) Assignee: STMicroelectronics (Research & Development) Limited, Marlow-Buckinghamshire (GB)

(*) Notice: Subject to any disclaimer, the term of this patent is extended or adjusted under 35 U.S.C. 154(b) by 357 days.

(21) Appl. No.: 12/899,137

(22) Filed: Oct. 6, 2010

(65) Prior Publication Data

US 2011/0105181 A1    May 5, 2011

(30) Foreign Application Priority Data

Oct. 30, 2009 (GB) .................................. 0919036.4

(51) Int. Cl.
*H04N 5/228* (2006.01)

(52) U.S. Cl. ................................. 348/208.2; 348/208.7

(58) Field of Classification Search ............. 348/208.99, 348/208.2, 208.4–208.8, 208.11
See application file for complete search history.

(56) References Cited

U.S. PATENT DOCUMENTS 8,169,487 B2 * 5/2012 Noguchi .................... 348/208.2

FOREIGN PATENT DOCUMENTS

| JP | 2004228644 | 8/2004 |
| JP | 2009063896 | 3/2009 |

* cited by examiner

*Primary Examiner* — Daniel M Pasiewicz
(74) *Attorney, Agent, or Firm* — Allen, Dyer, Doppelt, Milbrath & Gilchrist, P.A.

(57) ABSTRACT

A method of motion compensation in a camera may include deriving a motion signal representative of a motion of the camera, processing video frames of a video signal from an image sensor of the camera during a viewfinder mode to derive motion vectors between pairs of frames, and processing the motion signal with a number of combinations of gain and offset factors during the viewfinder mode. The method may also include determining combinations for producing threshold motion vectors, and applying the combination producing the threshold motion vectors for processing the motion signal during a still capture mode to produce a control signal for a motion compensating element for optics of the camera.

31 Claims, 2 Drawing Sheets

CAMERA IMAGE STABILIZATION

FIELD OF THE INVENTION

This present disclosure relates to image stabilization in digital cameras.

BACKGROUND OF THE INVENTION

Optical image stabilization is typically provided in cameras and in other optical apparatuses, such as binoculars. Optical image stabilization is performed by providing a, movable optical element within the optical system, which is moved to compensate for movement, such as from a hand tremor. As shown in FIG. 1, this is normally performed by an open loop system in which motion is detected by a gyro. The gyro signal is processed to remove gyro offset and then perform high pass filtering and integration. The resulting signal is used to control movement of the movable optical element.

Such open loop control may be subject to a number of errors. The offset and the sensitivity of the gyro both may vary with temperature. The motion compensator response also may vary with temperature. The integration in the signal processing may accentuate the problem.

In sophisticated cameras, these problems can be minimized by careful attention to the design and quality of electronic and mechanical components. However, in low-cost cameras, there may be a limit to the quality and consistency that can be achieved. Moreover, in applications such as cameras for incorporation in mobile phones, the physical size of the camera is limited, typically in the region of 1 cm$^3$, and this very small size may necessitate compromises in opto-mechanical component performance.

Another known form of image stabilization is digital image stabilization, which is used in some video (moving picture) cameras. This is achieved by a combination of cropping and object tracking. Referring to FIG. 2, the output image 10 is cropped from a larger image area 12. Motion of an object 14 is tracked between frames. In FIG. 2, the object 14 moves by motion vectors x, y between frames. By moving the crop 10 by x, y, the object appears to remain stationary within the output video. The motion vector signals are typically filtered at 0.3 Hz to allow deliberate camera motion while removing any high frequency motion.

SUMMARY OF THE INVENTION

An object may be to provide image stabilization for digital cameras that may be suitable for incorporation in small cameras, such as those found in mobile phones.

However, the present disclosure is not limited to such cameras and may be utilized, for example, in devices which are purely hand-held cameras.

An aspect is directed to a camera that may have an optical path and an image sensor, the camera having a motion compensation system. The motion compensation system may include a motion compensating optical element positioned in the optical path and driven by an actuator, a gyro providing a gyro signal representative of motion of the camera, an optical image stabilization (OIS) processor arranged to perform signal processing on the gyro signal, which includes applying variable gain and gyro offset correction factors, a digital image stabilization (DIS) processor arranged to receive video frames from the image sensor during a viewfinder mode and to derive motion vectors representing movement of an object between pairs of frames, and a control circuit operating to cause the OIS processor to cycle through a number of combinations of gain and offset during the viewfinder mode and to detect which of the combinations results in the smallest motion vectors in the DIS processor. The control circuit also may operate to cause that combination to be used in the OIS processor when an image is to be recorded.

In some embodiments, the gyro signal may be high-pass filtered before being applied to the OIS processor. The video signal may also be high-pass filtered before being applied to the DIS processor. Suitably, both signals may be filtered between 0.1 Hz and 0.5 Hz, preferably at about 0.3 Hz. For example, the OIS processor may integrate the gyro signal.

Another aspect is directed to a method of motion compensation in a digital camera. The method may include deriving a motion signal representative of motion of the camera, processing video frames of a video signal from an image sensor of the camera during a viewfinder mode to derive motion vectors between pairs of frames, processing the motion signal with a number of combinations of gain and offset during the viewfinder mode, determining which of the combinations produces the smallest motion vectors, and applying that combination for processing the motion signal during a still capture mode to produce a control signal for a motion compensating element of the camera optics.

In some embodiments, the number of combinations and the video frame rate may be chosen such that the determination of smallest motion vectors occurs during a period no longer than 5 seconds, preferably about 2 seconds. About 25 combinations of gain and offset may advantageously be used.

The motion signal may be high-pass filtered before being processed. The video signal may also be high-pass filtered before being processed. Both signals may be filtered at between 0.1 Hz and 0.5 Hz, preferably about 0.3 Hz. The motion signal processing may include integration. A further aspect of the present disclosure is directed to a mobile phone including the camera defined above.

BRIEF DESCRIPTION OF THE DRAWINGS

An embodiment of the present disclosure may now be described, by way of example only, with reference to the drawings, in which.

DETAILED DESCRIPTION OF THE PREFERRED EMBODIMENTS

Figure 1:
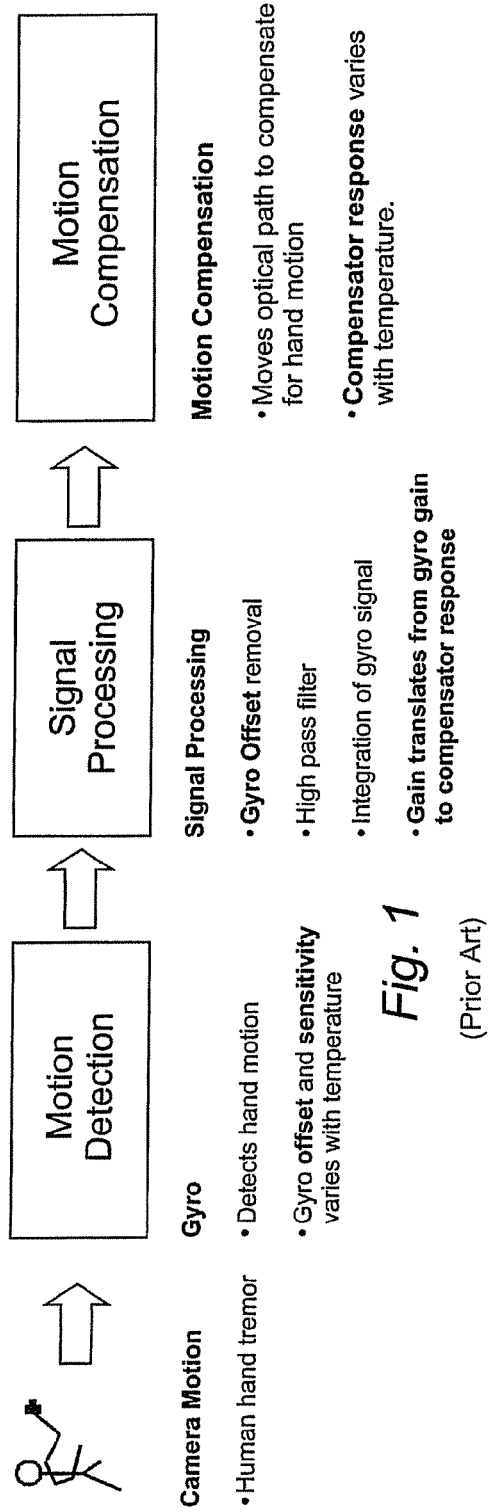
FIGS. 1 and 2 are diagrams, according to the prior art.
Figure 2:
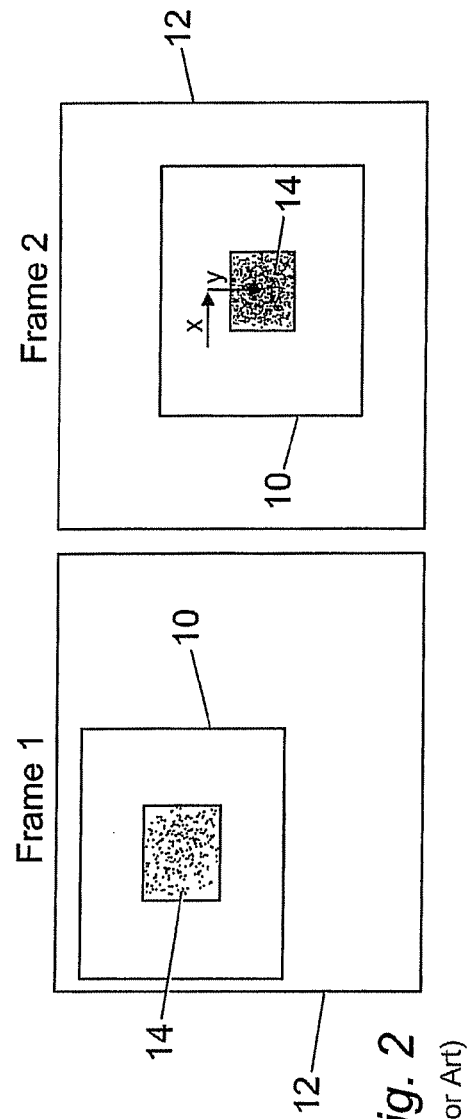
Figure 3:
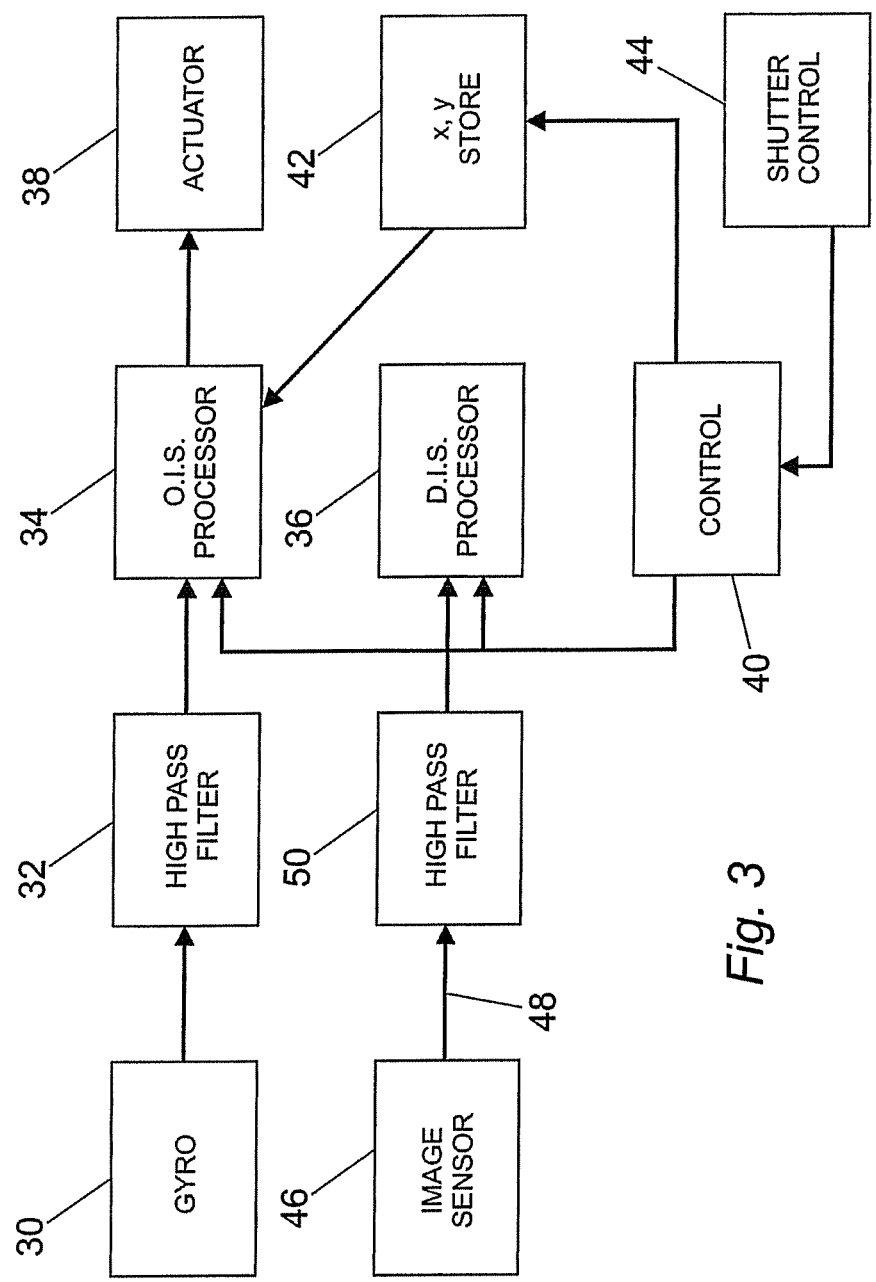
FIG. 3 is a schematic block diagram of a system, according to the present disclosure.

Referring to FIG. 3, in a camera embodying the present disclosure, motion is detected by a gyro 30. The output signal from the gyro 30 is filtered by a high-pass filter 32 to remove frequencies below, in this embodiment, 0.3 Hz. The filtered gyro signal is passed to an optical image stabilization (OIS) processor 34. The OIS processor 34 may include means or an integrator for integration of the gyro signal. A motion compensation actuator 38 is controlled by the OIS processor 34 in the manner to be described.

An image sensor 46 of the camera provides image signals at 48 to a digital image stabilization (DIS) processor 36 via a high-pass filter 50. The high pass filter 50 suitably has the same frequency characteristic as the filter 32. When the camera is switched on, and until the shutter control is operated, the signals 48 constitute a video stream for display on a viewfinder screen.

The signal processors 34, 36 are controlled by a control circuit 40. The operation is based on the fact that if the OIS system is optimized, then the DIS motion vectors should be zero. The control circuit 40 causes the OIS processor 34 during the viewfinder video mode to cycle through a range of gain and offset settings. For each pair of settings, the DIS processor produces motion vectors by examining motion of an object between first and second frames of a pair of successive frames. Distinguishing, selecting and tracking a suitable object within the field of view is known from the field of digital image stabilization. The resulting motion vectors are stored in a store 42. When the user operates the shutter control 44, the control circuit 40 selects the combination of gain and offset which has produced the smallest motion vectors, and causes the OIS processor 34 to apply this combination in controlling the motion compensation actuator 38, thus optimizing the compensation.

One suitable arrangement is to use 25 different gain/offset combinations. Each of these may be maintained for two video frames in order to capture motion vectors. Therefore a time period of about 2 seconds may be used to cycle through the 25 combinations, which may typically be comfortably within the time taken by the user find the picture in the viewfinder. Other time periods up to about 5 seconds may be used.

The present disclosure thus provides a way by which an open-loop OIS system can be optimized by the application of DIS techniques. The optimization can be handled digitally within signal processing circuitry which can, for example, be part of a single-chip CMOS image sensor. The optimization allows image stabilization to be achieved in a small low-cost camera without requiring use of highly accurate opto-mechanical components.

That which is claimed is:

1. A camera comprising:
an image sensor configured to receive an image along an optical path;
an actuator; and
a motion compensation system configured to cooperate with said image sensor and comprising
a motion compensating optical element positioned in said optical path and configured to be driven by said actuator,
a gyro configured to provide a gyro signal representative of a motion of the camera,
an optical image stabilization (OIS) processor configured to perform signal processing on the gyro signal, the signal processing comprising applying variable gain and gyro offset correction factors,
a digital image stabilization (DIS) processor configured to receive a video signal from said image sensor during a viewfinder mode and to derive motion vectors representing movement of an object between pairs of frames from the video signal, and
a control circuit configured to cause said OIS processor to cycle through a number of combinations of the variable gain and gyro offset correction factors during the viewfinder mode and to detect which combination results in a threshold motion vector in said DIS processor,
said control circuit being configured to cause the combination resulting in the threshold motion vector to be used in said OIS processor when the image is to be recorded.

2. The camera according to claim 1 wherein the threshold motion vector comprises a minimum motion vector.

3. The camera according to claim 2 wherein said motion compensation system further comprises a first high-pass filter configured to filter the gyro signal and output it to said OIS processor.

4. The camera according to claim 3 wherein said motion compensation system further comprises a second high-pass filter configured to filter the video signal and to output the filtered video signal to said DIS processor.

5. The camera according to claim 4 wherein said first and second high-pass filters are configured to filter between 0.1 Hz and 0.5 Hz.

6. The camera according to claim 3 wherein said first and second high-pass filters are configured to filter frequencies below 0.3 Hz.

7. The camera according to claim 2 wherein said OIS processor is configured to integrate the gyro signal.

8. A camera comprising:
an image sensor configured to receive an image along an optical path;
an actuator; and
a motion compensation system configured to cooperate with said image sensor and comprising
a motion compensating optical element positioned in said optical path and configured to be driven by said actuator,
a gyro configured to provide a gyro signal representative of a motion of the camera,
a first high-pass filter configured to filter the gyro signal,
an optical image stabilization (OIS) processor configured to process the filtered gyro signal by at least integrating the filtered gyro signal and comprising applying variable gain and gyro offset correction factors,
a digital image stabilization (DIS) processor configured to receive a video signal from said image sensor during a viewfinder mode and to derive motion vectors representing movement of an object between pairs of frames from the video signal, and
a control circuit configured to cause said OIS processor to cycle through a number of combinations of the variable gain and gyro offset correction factors during the viewfinder mode and to detect which combination results in a threshold motion vector in said DIS processor,
said control circuit being configured to cause the combination resulting in the threshold motion vector to be used in said OIS processor when the image is to be recorded.

9. The camera according to claim 8 wherein the threshold motion vector comprises a minimum motion vector.

10. The camera according to claim 8 wherein said motion compensation system further comprises a second high-pass filter configured to filter the video signal and to output the filtered video signal to said DIS processor.

11. The camera according to claim 10 wherein said first and second high-pass filters are configured to filter between 0.1 Hz and 0.5 Hz.

12. A mobile phone comprising:
a camera comprising
an image sensor configured to receive an image along an optical path,
an actuator, and
a motion compensation system configured to cooperate with said image sensor and comprising
a motion compensating optical element positioned in said optical path and configured to be driven by said actuator,
a gyro configured to provide a gyro signal representative of a motion of the camera, an optical image stabilization (OIS) processor configured to perform signal processing on the gyro signal comprising applying variable gain and gyro offset correction factors, a digital image stabilization (DIS) processor configured to receive a video signal from said image sensor during a viewfinder mode and to derive motion vectors representing movement of an object between pairs of frames from the video signal, and a control circuit configured to cause said OIS processor to cycle through a number of combinations of the variable gain and gyro offset correction factors during the viewfinder mode and to detect which combination results in a threshold motion vector in said DIS processor, said control circuit being configured to cause the combination resulting in the threshold motion vector to be used in said OIS processor when the image is to be recorded.

13. The mobile phone according to claim 12 wherein the threshold motion vector comprises a minimum motion vector.

14. The mobile phone according to claim 12 wherein said motion compensation system further comprises a first high-pass filter configured to filter the gyro signal and output it to said OIS processor.

15. The mobile phone according to claim 14 wherein said motion compensation system further comprises a second high-pass filter configured to filter the video signal and to output the filtered video signal to said DIS processor.

16. A method of motion compensation in a camera, the method comprising:

deriving a motion signal representative of a motion of the camera;

processing video frames of a video signal from an image sensor of the camera during a viewfinder mode to derive motion vectors between pairs of frames;

processing the motion signal with a number of combinations of gain and offset factors during the viewfinder mode;

determining a combination for producing a threshold motion vector; and applying the combination producing the threshold motion vector for processing the motion signal during an image capture mode to produce a control signal for a motion compensating element for optics of the camera.

17. The method according to claim 16 wherein the threshold motion vector is a minimum motion vector.

18. The method of claim 16 further comprising choosing a number of combinations and a video frame rate so that a duration of the determining of the combination producing the threshold motion vector is no longer than 5 seconds.

19. The method of claim 18 further comprising choosing the number of combinations and the video frame rate so that a duration of the determining of the combination producing the threshold motion vector is no longer than 2 seconds.

20. The method of claims 16 further comprising high-pass filtering the motion signal before being processed.

21. The method of claim 20 further comprising high-pass filtering the video signal before being processed.

22. The method of claim 21 further comprising high-pass filtering the motion and video signals between 0.1 Hz and 0.5 Hz.

23. The method of claim 21 further comprising high-pass filtering the motion and video signals below 0.3 Hz.

24. The method of claim 16 wherein the processing of the motion signal includes integrating the motion signal.

25. A method of motion compensation in a camera, the method comprising:

deriving a motion signal representative of a motion of the camera;

processing video frames of a video signal from an image sensor of the camera during a viewfinder mode to derive motion vectors between pairs of frames;

high-pass filtering the motion signal, integrating the motion signal, and applying a number of combinations of gain and offset factors during the viewfinder mode;

determining a combination for producing a threshold motion vector; and applying the combination producing the threshold motion vector for processing the motion signal during an image capture mode to produce a control signal for a motion compensating element for optics of the camera.

26. The method according to claim 25 wherein the threshold motion vector comprises a minimum motion vector.

27. The method of claim 25 further comprising choosing a number of combinations and a video frame rate so that a duration of the determining of the combination for producing the threshold motion vector is no longer than 5 seconds.

28. The method of claim 27 further comprising choosing the number of combinations and the video frame rate so that a duration of the determining of the combination for producing the threshold motion vector is no longer than 2 seconds.

29. The method of claim 25 further comprising high-pass filtering the video signal before being processed.

30. The method of claim 29 further comprising high-pass filtering the motion and video signals between 0.1 Hz and 0.5 Hz.

31. The method of claim 29 further comprising high-pass filtering the motion and video signals below 0.3 Hz.

* * * * *